United States Patent [19]

Wyman et al.

[11] 4,310,042

[45] Jan. 12, 1982

[54] INSERT FOR NON-PNEUMATIC TIRES

[75] Inventors: Ransome J. Wyman, Calabases; Richard A. Alshin, Long Beach; Charles H. Gilbert, Fullerton, all of Calif.

[73] Assignee: Carefree Bicycle Tire Company, Marina Del Rey, Calif.

[21] Appl. No.: 148,369

[22] Filed: May 9, 1980

Related U.S. Application Data

[63] Continuation-in-part of Ser. No. 37,393, May 8, 1979, Pat. No. 4,273,176, which is a continuation-in-part of Ser. No. 906,691, May 16, 1978.

[51] Int. Cl.³ .................................................. B60C 7/12
[52] U.S. Cl. ..................................... 152/322; 152/400
[58] Field of Search ............... 152/322, 318, 312, 400, 152/311, 327, 166, 157, 155, 329

[56] References Cited

U.S. PATENT DOCUMENTS

| 365,091 | 6/1887 | Owen | 152/379.1 |
| 862,785 | 8/1907 | Andrew | 152/322 |
| 917,734 | 4/1909 | Kempshall | 152/166 |
| 1,042,941 | 10/1912 | McCormack | 152/320 |
| 1,335,115 | 3/1920 | Huffman | 152/322 |

FOREIGN PATENT DOCUMENTS 55372 8/1921 Fed. Rep. of Germany ...... 152/322

OTHER PUBLICATIONS

Rubber World, Jun. 1977, Reprint, "Urethane Bicycle Tire Combines Flatproof, Pneumatic Qualities".

Primary Examiner—Michael W. Ball
Attorney, Agent, or Firm—K. H. Boswell

[57] ABSTRACT

A monolithic non-pneumatic urethane tire for use on a wheel rim of the type having a pair of laterally spaced bead flanges formed with wheel rim side walls which extend upwardly from the bottom of the wheel rim is improved by providing a tire body with certain structural features and locating a tubular insert inside the tire body. The tire body has a circumferentially extending tunnel on its inside and includes side walls which converge outwardly to a thickened portion. The thickened portion forms a bead shoulder that seats on top of the bead flanges of the wheel rim and also includes a bead which extends downwardly into the wheel rim adjacent the side walls of the wheel rim. The tubular insert is a semiresilient hollow tube mounted within the tunnel of the tire body to maintain the bead portion of the tire body against the side walls of the wheel rim. The tube is resilient against deflection along a line passing through both of the beads but is capable of being distorted along a line passing through the tire body toward the center of the wheel rim.

6 Claims, 4 Drawing Figures

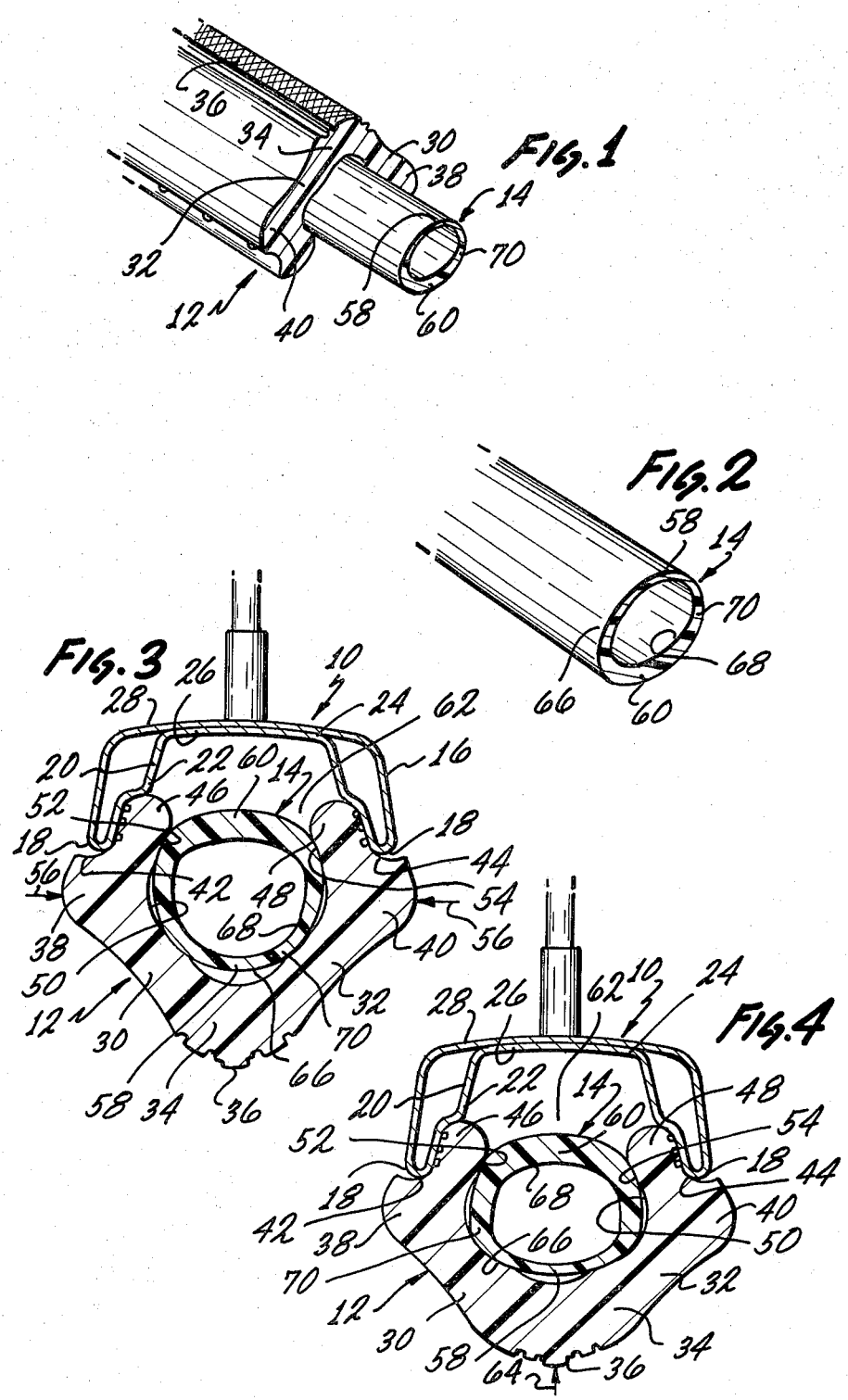

INSERT FOR NON-PNEUMATIC TIRES

CROSS-REFERENCE TO RELATED APPLICATIONS

This application is a continuation-in-part of our application Ser. No. 37,393 entitled "MONOLITHIC TIRES" filed May 8, 1979, now U.S. Pat. No. 4,273,176 which in turn is a continuation-in-part of application Ser. No. 906,691 entitled "BICYCLE TIRE WITH COMPRESSION AMPLIFICATION" filed May 16, 1978. The disclosures of both of these applications are herein incorporated by reference.

BACKGROUND OF THE INVENTION

This invention is directed to improvements in non-pneumatic urethane tires. In a non-pneumatic tire a central tunnel can be formed in the tire body which accepts a segment of semiresilient hollow tubing. This hollow tubing maintains beads formed as a part of the tire body in a fixed relationship with respect to side walls on the wheel rim on which the tire is mounted regardless of the width of the wheel rim.

In our applications Ser. No. 37,393 and Ser. No. 906,691 the advantages of non-pneumatic monolithic urethane elastomer tires are described and compared to the disadvantages of pneumatic bicycle tires. Since the non-pneumatic urethane tires do not utilize inner tubes certain characteristics must be incorporated in both the design of and the materials used for these non-pneumatic urethane tires. The tire must be formed of material hard enough to resist abrasion and wear yet soft enough to provide a satisfactory ride. Further, these tires are made with a hollow interior which reduces weight of the tire and improves ride characteristics.

Unfortunately, even though manufacturers utilize standard diameters for wheel rims they have not standardized the width or the depth of the rim. As a result of this urethane tires having hollow interiors can come off of the rim on which they are mounted if they are subject to sufficient forces directed to the tire body which are normal or perpendicular to the plane which contains the tire in the wheel rim. In our application Ser. No. 906,691 we described an H-shaped bead lock insert which alleviates this problem. However, this insert works best when locking grooves are formed in the tire which it fits into. This renders the molding of the tire more complex. Further, this insert must be positioned on the wheel rim prior to mounting of the tire body which complicates the mounting procedure.

SUMMARY OF THE INVENTION

In view of the above it is an object of this invention to provide a non-pneumatic urethane tire body and an insert to be used with the same which is extremely economical to produce but which also has desirable ride characteristics. Further, it is an objective of this invention to provide an insert which is easy to install within the tire body, yet prevents the bead portion of the tire body from separating from the side walls of the wheel rim on which the tire is mounted. It is an additional object to provide an insert which is extremely low cost and thus contributes to the economy and the reliability of the non-pneumatic urethane tire. It is a further object to provide a novel shaped insert which will provide for the maintenance of the tire body flanges against the wheel rim regardless of the rim's width or depth yet will not interfere with flexing of the tread portion of the tire body.

These and other objects are achieved by providing an improvement in a non-pneumatic tire having a solid monolithic tire body made of a urethane elastomer for use on a wheel rim which includes a pair of laterally spaced bead flanges formed with side walls and extending upwardly from the bottom of the wheel rim which comprises: said tire body having a circumferentially extending tunnel formed on the inside of said tire body; said tire body having inclined side walls that converge outwardly such that they are essentially V shaped in cross-section, at least that portion of said tire body which includes the apex wherein said side walls meet with each other forming a contact surface wherein said tire body contacts a road surface; each of said tire body side walls terminating in a thickened portion forming a bead shoulder that sits on the top of the bead flanges of said wheel rim and said thickened portion also including a bead extending essentially downwardly, the interior surfaces of said beads forming the lowermost side portions of said tunnel; each of said beads fitting into said wheel rim adjacent to one of the side walls of said wheel rim; a segment of tubing formed of a semi-resilient material and capable of returning to its formed state after being distorted from said formed state by an outside force, said tubing having an integrally formed wall and a hollow interior, said tubing extending circumferentially within said tunnel around the inside of said tire body and contained in a cavity formed by said tunnel and the bottom of said wheel rim, said tubing sized to fit against the interior surfaces of said bead retaining said bead adjacent to said side walls of said wheel rim, at least the portion of said hollow tubing located closest to said contact surface of said tire body capable of being distorted inwardly into the hollow interior of said tubing if contacted by a portion of said tire body when said tire body is distorted in a direction toward said bottom of said wheel rim in response to distortion of said contact surface of said tire body by an object external said tire body.

Further, these objects are provided by a semiresilient hollow tube sized to fit within the interior of a tire body which includes a circumferentially extending tunnel and a bead flange extending from the side walls of the tire body which comprises: a hollow toroidal tube having a wall, said wall having an outside surface and an inside surface; said hollow toroidal body formed of a semi-resilient material capable of returning to its formed state after being distorted by an outside force from said formed state; in cross-section said outside surface of said wall being formed into a circle and said inside surface of said wall also being capable of being formed into a circle; the center of said circle capable of being formed by said inside surface being off center from the center of said circle capable of being formed by said outside surface such that the thickness measured between said outside surface and said inside surface of the wall in cross-section is of a different dimension about two points which with respect to the cross-section of said wall lie essentially 180 degrees from each other and said thickness measured between said outside surface and said inside surface of the wall in cross-section both to the right and left of said two points, respectively, gradually change from the dimension of the thickness of the wall at one of said points to the dimension at the other of said points.

The wall of the hollow tubing in cross-section preferably is shaped as a simple closed curve. Said continuous closed wall is preferably oval in shape. Said oval shaped wall preferably has a greater resistance to distortion of wall with respect to its cross-sectional shape in a direction which passes through those portions of the tube which fit adjacent to the beads of the tire body compared to a direction perpendicular to this.

A more preferred form of the tubing of this invention includes the tubing wall in cross-section having an outside surface which is formed into a circle and an inside surface which is also formed into a circle. The center of the circle formed by the inside surface is off center from the center of the circle formed by the outside surface and is displaced in a direction toward that portion of the wall which is positioned closest to the contact surface portion of the tire body such that the thickness of the wall of the tubing in cross-section in that portion of the tubing located closest to the cutout surface portion of the tire body is less than the thickness of that portion of the tubing located furthest from the contact surface portion of the tire body. The portions of the wall between the above two mentioned portions gradually tapering from one of the above mentioned portions to the other of the above mentioned portions.

BRIEF DESCRIPTION OF THE DRAWING

This invention will be better understood when taken in conjunction with the drawing wherein:

FIG. 1 is an isometric view of a section of the tire body and insert tubing of the invention as shown in the preferred form;

FIG. 2 is an isometric view of the tubing of the invention isolated from the tire body;

FIG. 3 is a side elevational view, in section, of the tire, the insert tubing and the wheel rim (which does not form a part of the invention) shown in a normal or unloaded position;

FIG. 4 is a side elevational view in section of those components shown in FIG. 3 except the tire body and the tube insert are shown under compression from a force directed to the tread or contact surface portion of the tire.

This invention uses certain principles and/or concepts as are set forth and defined in the claims appended to this specification. Those skilled in the tire manufacturing art will realize that these principles and/or concepts can be used in a number of differently appearing embodiments which do not exactly correspond to the preferred embodiment shown in the drawing and described in this specification. For these reasons this invention is to be construed in light of the claims and is not to be construed as being limited to the exact embodiment shown in the figures and described in the specification.

DETAILED DESCRIPTION

There are three main components which are necessary to understand this invention. The first of these is a wheel rim 10 which is shown in the figures but which in fact does not form a part of the invention. Its description is necessary, however, for an understanding of the invention. For simplicity the wheel rim 10 will hereinafter be referred to as the rim 10. Mounted on the rim 10 is the tire body 12. Located between the rim 10 and the tire body 12 is the insert tubing 14 hereinafter described simply as tubing or tube 14.

The rim 10 shown is a standard rim typically used on bicycles. The invention can be used on this rim 10. However, it is also susceptible to use on rims differing slightly from this rim 10. The rim 10 shown has a set of flanks collectively identified by the numeral 16 located on the respective sides of the rim 10 which roll inwardly to form a set of bead flanges 18. After rolling inwardly at the bead flanges 18 the sheet metal of which the rim 10 is formed forms a set of side walls 20, then rolls through shoulders 22 and forms a channel 24. The bottom 26 of the channel 24 lies adjacent to the outside or crown portion 28 which forms the inside periphery of the rim 10. The tire body 12 and the insert 14 are useful on this type of rim 10 as well as simpler rims which only have the bead flanges 18, the inside rim sidewalls 20 and a rim bottom 26.

The tire body 12 of the invention is described in detail in our application Ser. No. 37,393. Briefly the tire body 12 has two side walls 30 and 32 which converge at a crown 34. The crown 34 serves as the contact surface wherein the tire body 12 contacts a road surface. Therefore, located at the crown 34 is the tread portion 36 of the tire body 12. The side walls 30 and 32 terminate at thickened portions 38 and 40. The thickened portions 38 and 40 are each divided to form bead shoulders 42 and 44 and beads 46 and 48. When the tire body 12 is mounted to the rim 10 the bead shoulders 42 and 44 rest on the bead flanges 18 and the beads 46 and 48 fit against the side walls 20 of the rim 10. Extending circumferentially around the inside of the tire body 12 is a tunnel 50. The interior surfaces 52 and 54 of the beads 40 and 42 form the lowermost portion of the tunnel 50.

The tubing 14 fits within the tunnel 50 when the tire body 12 is mounted on the rim 10. The tubing 14 fits adjacent to the interior surfaces 52 and 54 of the beads 46 and 48. This spreads the beads 46 and 48 in the manner shown in FIG. 3. If the tire body 12 is subjected to a force that produces a side thrust, i.e., a thrust directed along one of the arrows collectively identified by the numeral 56 in FIG. 3, there is a natural tendency for the beads 46 or 48 to pull away from the side walls 20. The presence of the tubing 14 within the tunnel 50 inhibits this movement. The side thrust is a particularly bothersome problem when the tire is not rolling but is standing still. At this time the side thrust can be directed to a very small segment of the tire body 12 tending to pull that small segment away from the side wall 20.

In all embodiments of the invention the tubing 14 is formed of a semiresilient material such as polyethylene. The tubing 14 is thus easily extruded from a readily available cheap material. When located within the tire body 12 the tubing 14 will maintain its extruded shape and even if a sharp object such as a nail or pin punctures both the tire body 12 and the tubing 14, neither the tire body 12 nor the tubing 14 will be distorted or otherwise deformed or influenced at any other point other than the puncture point. When the object is withdrawn from the tire body 12 and the tubing 14 a certain portion of the material around the puncture hole in the tubing 14 will cold flow to a small extent to seal a portion of the puncture area. This, however, is not mandatory in that even though the tubing 14 has been punctured the remainder of the tubing 14 maintains its structural strength and its stability as indicated in the remainder of this specification.

Because the tubing 14 is formed of polyethylene or some other semiresilient material it has the property of being able to return to its original shape if mildly deformed. By mildly deformed it is meant that the material is not deformed beyond the point wherein cold flow of the material takes place or sufficient stress is introduced into the material to mechanically disrupt its structure by ripping, tearing etc. In any event the tubing 14 within the limits imposed on it when it is mounted within the tire body 12 can return to its original shape when it is distorted. Normally the distortion will be caused only when the contact surface or the tread portion 36 of the tire is radically distorted inwardly toward the bottom 26 of the rim 10. This, of course, can happen whenever the rim 10 and tire body 12 strike a very sharp object or strike an object with a great deal of force.

The cross-section of the wall 70 of the tube can be formed in a variety of different geometrical shapes. Preferably these would be limited to preferred oval shapes wherein the outside surface of the wall 70 is always concave. Since the tubing 14 is easily manufactured by extrusion these types of shapes are made utilizing simply shaped extrusion dies resulting in good internal structure strength with a minimum of surface area of the wall and a minimum of volume of the semi-resilient material used in forming the wall 70. Other shapes, of course, can be used. The oval is, of course, part of a classification of shapes defined as simple closed curves. Other acceptable simple closed curves would be multi-sided polygons and the like. It is considered preferable that the cross-sectional shape of the wall 70 be continuous; however, a crescent-like shape formed by having two circles of different diameters one lying within the other and touching each other at one point and both circles being broken at this point such that the points of the crescent are very close together could also be utilized.

Rims for wheeled vehicles such as bicycles for which this invention is primarily directed but not limited to are standardized with respect to their diameter. They are, however, not standardized with respect to both the wheel rim depth and width as noted before. The tire body 12, therefore, while it may be designated as being for a 27 inch bicycle tire wheel rim may have to be mounted on rims of varying width and depth. A certain amount of compensation for variances of rim width and depth is incorporated into the tubing 14 by the use of semiresilient material in its manufacture. Thus, for a very narrow rim, the beads 46 and 48 would naturally squeeze or compress the tubing 14 when the beads were inserted against the side walls 20 of the rim 10. Any such compression of the tubing 14 would only serve to hold the beads 46 and 48 tighter against the side walls 20 with respect to side thrust. If, however, an exceedingly wide rim is used, the tubing 14 could be chosen to be of a slightly larger dimension in cross-section than that used with exceedingly narrow rims. Generally the tubing 14 will have a width in cross-section of about one half inch. For exceedingly wide rims tubing of approximately five eighths inch could be used.

In the preferred embodiment of the tubing 14 shown in the figures the tubing 14 is formed such that when viewed in cross-section it has a narrow portion 58 in its wall 70 at one position and at approximately 180° removed from that position a thickened portion 60. The portions of the wall 70 between these two portions 58 and 60 makes a smooth transition between the narrow and thickened portions.

When mounted inside of the tunnel 50 the narrow portion 58 is positioned to be located closest to the tread 36 of the tire body 12 and the thickened portion 60 is positioned to be located closest to the bottom 26 of the rim 10. Together the tunnel 50 and the bottom 26 of the rim 10 form a channel 62 in which the tubing 14 is located. If the channel 62 is distorted of course the tubing 14 located therein will also be distorted. Distortion of this channel 62 can occur in two ways. First the channel 62 can be made narrower by a side thrust squeezing in on one of the beads 46 or 48. Secondly the channel 62 can be compressed by a compression thrust represented by the arrow 64 pushing in the tread portion 36 of the tire body 12 toward the bottom 26 of the rim 10. A compression thrust occurs whenever the tire rolls over an object such as a rock, stick or a curb or the like. For adequate ride characteristics the tire body 12 must absorb this compression thrust and distribute it within the tire body 12. If the compression thrust is not absorbed the rider on a vehicle on which the rim 10 and the tire body 12 are mounted will experience a jar or bump. Because the narrow portion 58 of the tubing 14 contains less material it is easily distorted inwardly into the hollow interior of the tire body 12 toward the thickened portion 60. In being so distorted it absorbs some of the compression thrust and/or allows the tire to absorb or distribute the compression thrust. Since, however, the portion of the tubing 14 lying adjacent to the beads 46 and 48 and the bottom 26 of the rim 10 is thicker it is not easily distorted and thus will not absorb or be distorted by side thrusts. It thus can maintain the beads 46 and 48 against the side walls 20.

In its preferred form the tubing 14 is extruded in long lengths or segments. When the tire body 12 is mounted to the rim 10 one of the beads 46 or 48 is pulled over one of the side walls 20 locating that bead in a position intermediate the side walls 20. The tubing 14 is then inserted within the tunnel 50 all around the circumference of this tunnel 50. The tubing 14 is cut such that the cut end appropriately abuts up against the end of the tubing 14 first inserted. It is not mandatory that a precision cut be made in the tubing 14 but simply that the ends of the tubing 14 lie close together. While it is preferred to have the ends of the tubing 14 in the tunnel 50 as close together as possible a space of several centimeters between these two ends will not deter the function of the tubing 14 within the tire body 12. After the tubing 14 is inserted within the tunnel 50 the other bead 46 or 48 is rolled over the side wall 20 of the rim 10. Some compression akin to the side thrust force will be exerted against the tubing 14 during this operation. However, since the tubing 14 is made of a semiresilient material it is able to absorb this compression and immediately return to its extruded state within the tunnel 50 holding the beads 46 and 48 against the side walls 20.

In the preferred form of the tubing 14 shown in the figures in cross-section the wall 70 of the tubing 14 could be described as having an outside surface 66 which is capable of being formed in a circular shape. Normally this would be the extruded form of the tubing 14 and the tubing 14 would approximately or essentially assume this shape whenever it is not subjected to any compression forces. Because one portion of the wall 70 of the tubing 14 illustrated in the figures is thicker than the other portions, in reality the tubing 14 as illustrated assumes a slightly flattened eliptical shape as is seen in FIG. 3. The inside surface 68 of the tubing 14 would also be capable of being essentially formed as a circle. However, the center of this circle would be off center from the center of the circle forming the outside surface 66. Thus, the narrow portion 58 and the thickened portion 60 of the walls of the tubing 14 are appropriately formed. Since both the outside surface 66 and the inside surface 68 are somewhat circular the areas of the wall of the tubing 14 between the narrow portion 58 and the thickened portion 60 gradually taper from one of these portions to the other of these portions.

While it is preferred that the tubing 14 simply be placed inside of the tunnel 50 as a segment which is coiled into a split ring, the ends of this split ring could be joined to form a toroidal body. Thus, once the appropriate segment of the tubing 14 was cut off the ends of the tubing 14 could be solvent welded to form this toroidal body. As noted before generally the rims supplied by different bicycle manufacturers are not of standard dimensions. Therefore it is preferred that the tubing 14 be supplied such that it can be custom fit for each particular rim. If, however, a large plurality of standard rims were utilized the tubing 14 could be formed into a standard diameter toroidal body by appropriate solvent welding techniques or the like. If such a toroidal body were formed, since the tubing 14 is formed of a semiresilient material, it would allow the toroidal body to be pulled over the side walls 20 of the rim 10 during mounting.

We claim:

1. An improvement in a non-pneumatic tire having a solid monolithic tire body made of an elastomer for use on a wheel rim which includes a pair of laterally spaced bead flanges formed with side walls and extending upwardly from the bottom of the wheel rim which comprises:

said tire body having a circumferentially extending tunnel formed on the inside of said tire body;

said tire body having inclined side walls that converge at a crown, at least that portion of said tire body which includes the crown wherein said side walls meet with each other forming a contact surface wherein said tire body contacts a road surface;

each of said tire body side walls terminating in a thickened portion forming a bead shoulder that sits on the top of the bead flanges of said wheel rim and said thickened portion also including a bead extending essentially downwardly, the interior surfaces of said beads forming the lowermost side portions of said tunnel;

each of said beads fitting into said wheel rim adjacent to one of the side walls of said wheel rim;

a segment of tubing formed of a semiresilient material and capable of returning to its formed state after being distorted from said formed state by an outside force, said tubing having an integrally formed wall and a hollow interior, said tubing extending circumferentially within said tunnel around the inside of said tire body and contained in a cavity formed by said tunnel and the bottom of said wheel rim, said tubing sized to fit against the interior surfaces of said bead retaining said bead adjacent to said side walls of said wheel rim, at least the portion of said hollow tubing located closest to said contact surface of said tire body capable of being distorted inwardly into the hollow interior of said tubing if contacted by a portion of said tire body when said tire body is distorted in a direction toward said bottom of said wheel rim in response to distortion of said contact surface of said tire body by an object external said tire body;

said segment of semiresilient hollow tubing is a length of hollow tubing sized to fit within said hollow tunnel such that the respective ends of said length of said hollow tubing are positioned adjacent to one another when said hollow tubing is in said tunnel and said tire body is mounted on said wheel rim;

when said hollow tubing is located within said tunnel said hollow tubing has a greater resistance to distortion of its cross-sectional shape about a dimension which includes said portions of said wall of said tubing which fit adjacent to said interior surfaces of said bead compared to distortion of its cross-sectional shape about a dimension which includes said portion of said wall of said tubing positioned in said cavity closest to said contact surface of said tire body.

2. The hollow tube of claim 1 wherein:

said tube is discontinuous in one radial plane such that said tube is shaped as a hollow split ring.

3. An improvement in a non-pneumatic tire having a solid monolithic tire body made of an elastomer for use on a wheel rim which includes a pair of laterally spaced bead flanges formed with side walls and extending upwardly from the bottom of the wheel rim which comprises:

said tire body having a circumferentially extending tunnel formed on the inside of said tire body;

said tire body having inclined side walls that converge at a crown, at least that portion of said tire body which includes the crown wherein said side walls meet with each other forming a contact surface wherein said tire body contacts a road surface;

each of said tire body side walls terminating in a thickened portion forming a bead shoulder that sits on the top of the bead flanges of said wheel rim and said thickened portion also including a bead extending essentially downwardly, the interior surfaces of said beads forming the lowermost side portions of said tunnel;

each of said beads fitting into said wheel rim adjacent to one of the side walls of said wheel rim;

a segment of tubing formed of a semiresilient material and capable of returning to its formed state after being distorted from said formed state by an outside force, said tubing having an integrally formed wall and a hollow interior, said tubular extending circumferentially within said tunnel around the inside of said tire body and contained in a cavity formed by said tunnel and the bottom of said wheel rim, said tubing sized to fit against the interior surfaces of said bead retaining said bead adjacent to said side walls of said wheel rim, at least the portion of said hollow tubing located closest to said contact surface of said tire body capable of being distorted inwardly into the hollow interior of said tubing if contacted by a portion of said tire body when said tire body is distorted in a direction toward said bottom of said wheel rim in response to distortion of said contact surface of said tire body by an object external said tire body;

said segment of semiresilient hollow tubing is a length of hollow tubing sized to fit within said hollow tunnel such that the respective ends of said length of said hollow tubing are positioned adjacent to one another when said hollow tubing is in said tunnel and said tire body is mounted on said wheel rim;

said hollow tubing in cross-section has a continuous closed wall shaped essentially as a simple closed curve;

when said hollow tubing is located within said tunnel said hollow tubing has a greater resistance to distortion of its cross-sectional shape about a dimension which includes said portions of said wall of said tubing which fit adjacent to said interior surfaces of said bead compared to distortion of its cross-sectional shape about a dimension which includes said portion of said wall of said tubing positioned in said cavity closest to said contact surface of said tire body.

4. The tire of claim 3 wherein:

in cross-section the outside surface of said wall of said hollow tubing is essentially formed into a circle and the inside surface of said wall of said tubing is also essentially formed into a circle.

5. An improvement in a non-pneumatic tire having a solid monolithic tire body made of an elastomer for use on a wheel rim which includes a pair of laterally spaced bead flanges formed with side walls and extending upwardly from the bottom of the wheel rim which comprises:

said tire body having a circumferentially extending tunnel formed on the inside of said tire body;

said tire body having inclined side walls that converge at a crown, at least that portion of said tire body which includes the crown wherein said side walls meet with each other forming a contact surface wherein said tire body contacts a road surface;

each of said tire body side walls terminating in a thickened portion forming a bead shoulder that sits on the top of the bead flanges of said wheel rim and said thickened portion also including a bead extending essentially downwardly, the interior surfaces of said beads forming the lowermost side portions of said tunnel;

each of said beads fitting into said wheel rim adjacent to one of the side walls of said wheel rim;

a segment of tubing formed of a semiresilient material and capable of returning to its formed state after being distorted from said formed state by an outside force, said tubing having an integrally formed wall and a hollow interior, said tubing extending circumferentially within said tunnel around the inside of said tire body and contained in a cavity formed by said tunnel and the bottom of said wheel rim, said tubing sized to fit against the interior surfaces of said bead retaining said bead adjacent to said side walls of said wheel rim, at least the portion of said hollow tubing located closest to said contact surface of said tire body capable of being distorted inwardly into the hollow interior of said tubing if contacted by a portion of said tire body when said tire body is distorted in a direction toward said bottom of said wheel rim in response to distortion of said contact surface of said tire body by an object external said tire body;

said hollow tubing in cross-section has a continuous closed wall shaped essentially as a simple closed curve;

when said hollow tubing is located within said tunnel said hollow tubing has a greater resistance to distortion of its cross-sectional shape about a dimension which includes said portions of said wall of said tubing which fit adjacent to said interior surfaces of said bead compared to distortion of its cross-sectional shape about a dimension which includes said portion of said wall of said tubing positioned in said cavity closest to said contact surface of said tire body;

said segment of semiresilient hollow tubing is a length of hollow tubing sized to fit within said hollow tunnel such that the respective ends of said length of said hollow tubing are positioned adjacent to one another when said hollow tubing is in said tunnel and said tire body is mounted on said wheel rim;

in cross-section the outside surface of said wall of said hollow tubing is essentially formed into a circle and the inside surface of said wall of said tubing is also essentially formed into a circle;

the center of said circle formed by said inside surface is off center from the center of the circle formed by said outside surface and is displaced in a direction toward that portion of said wall of said hollow tubing which is positioned closest to said contact surface portion of said tire body such that the thickness of said wall of said tubing in cross-section of that portion of said tubing located closest to said contact surface portion of said tire body is less than the thickness of that portion of said tubing located furthest from said contact surface portion of said tire body and the thickness of said wall intermediate that portion of said tubing closest to said contact surface of the tire body and that portion of the tubing furthest away from said contact surface portion of the tire body gradually increases in thickness on both sides of said tubing in cross-section between that portion of said tubing closest to said contact surface portion of said tire body and that portion of said tubing furthest away from said contact surface portion of said tire body.

6. A semiresilient hollow tube sized to fit within the interior of a tire body which includes a circumferentially extending tunnel and a bead flange extending from the side walls of the tire body which comprises:

a hollow toroidal tube having a wall, said wall having an outside surface and an inside surface;

said hollow toroidal body formed of a semiresilient material capable of returning to its formed state after being distorted by an outside force from said formed state;

in cross-section said outside surface of said wall is formed into a circle and said inside surface of said wall is also formed into a circle;

the center of said circle formed by said inside surface being off center from the center of said circle formed by said outside surface such that the thickness measured between said outside surface and said inside surface of the wall in cross-section is of a different dimension about two points which with respect to the cross-section of said wall lie essentially 180 degrees from each other and said thickness measured between said outside surface and said inside surface of the wall in cross-section both to the right and left of said two points, respectively, gradually change from the dimension of the thickness of the wall at one of said points to the dimension at the other of said points;

said tube positionable within said tire body such that said thickness of said wall at the one of said points which has the smaller dimension of said two points is located closer to the road surface contact surface of said tire than the other of said two points.

* * * * *